(12) United States Patent
McConnell et al.

(10) Patent No.: US 12,297,007 B1
(45) Date of Patent: May 13, 2025

(54) INSULATED FOOD AND/OR BEVERAGE CONTAINER SYSTEM

(71) Applicant: Blue Skye Foods LLC, Hilliard, OH (US)

(72) Inventors: Joseph Patrick McConnell, Columbus, OH (US); Massoud Ghaffari-Nikou, Chicago, IL (US)

(73) Assignee: Blue Syke Foods LLC, Hilliard, OH (US)

( * ) Notice: Subject to any disclaimer, the term of this patent is extended or adjusted under 35 U.S.C. 154(b) by 0 days.

(21) Appl. No.: 18/424,832

(22) Filed: Jan. 28, 2024

Related U.S. Application Data

(60) Provisional application No. 63/532,191, filed on Aug. 11, 2023.

(51) Int. Cl.
*B65D 21/02* (2006.01)
*A47J 41/00* (2006.01)
(Continued)

(52) U.S. Cl.
CPC ...... *B65D 21/0233* (2013.01); *A47J 41/0077* (2013.01); *A47J 41/022* (2013.01);
(Continued)

(58) Field of Classification Search
CPC ............ B65D 21/0233; B65D 81/3869; B65D 81/3453; B65D 81/3446; B65D 51/18;
(Continued)

(56) References Cited

U.S. PATENT DOCUMENTS

| | | | | |
|---|---|---|---|---|
| 4,139,311 A | * | 2/1979 | Lorscheidt | B65D 41/0442 401/98 |
| 4,225,052 A | * | 9/1980 | Tector | B65D 25/2858 206/508 |

(Continued)

FOREIGN PATENT DOCUMENTS

| | | |
|---|---|---|
| DE | 102007022472 A1 | 11/2008 |
| EP | 0438789 A1 | 7/1991 |
| EP | 2641840 B1 | 10/2015 |

OTHER PUBLICATIONS

"Thermos Stainless Steel Coffee Cup Insulator", Amazon Website, Web page <https://www.amazon.com/Thermos-JCF600SS6-Paper-Cup-Insulator/dp/B003UD9KE6/>, 7 pages, dated Aug. 22, 2010, retrieved from www.amazon.com website on Feb. 24, 2024.

*Primary Examiner* — Nathan J Jenness
*Assistant Examiner* — Jennifer Castriotta
(74) *Attorney, Agent, or Firm* — The Law Office of Patrick F. O'Reilly III, LLC

(57) ABSTRACT

An insulated food and/or beverage container system includes an outer insulated container with a cylindrical body portion and a removable outer container lid that is configured to sealingly engage with the cylindrical body portion so as to minimize thermal transfer with an outside environment; and an inner container configured to fit within the outer insulated container, the inner container defining an interior cavity for holding food and/or a beverage, and the inner container including one or more first elements that are configured to matingly engage with one or more second elements on the cylindrical body portion of the outer insulated container so that the inner container is able to fully and securely nest inside the outer insulated container without any spinning or significant rattling. The outer insulated container and the inner container collectively provide enhanced insulating characteristics.

18 Claims, 11 Drawing Sheets

(51) Int. Cl.
*A47J 41/02* (2006.01)
*B65D 43/02* (2006.01)
*B65D 51/18* (2006.01)
*B65D 53/02* (2006.01)
*B65D 81/34* (2006.01)
*B65D 81/38* (2006.01)

(52) U.S. Cl.
CPC ......... *B65D 43/0202* (2013.01); *B65D 51/18* (2013.01); *B65D 53/02* (2013.01); *B65D 81/3453* (2013.01); *B65D 81/3869* (2013.01); *B65D 2543/00046* (2013.01); *B65D 2543/00092* (2013.01); *B65D 2543/00972* (2013.01)

(58) Field of Classification Search
CPC .. A47J 41/0061; A47J 41/0077; A47J 41/022; A47J 41/02
See application file for complete search history.

(56) References Cited

U.S. PATENT DOCUMENTS

| | | |
|---|---|---|
| 5,678,725 A | 10/1997 | Yamada et al. |
| 6,119,889 A | 9/2000 | Fujii et al. |
| 8,348,086 B2 * | 1/2013 | Apps .................. B65D 11/06 |
| | | 220/601 |
| 10,010,213 B2 | 7/2018 | Alexander et al. |
| 10,625,922 B2 | 4/2020 | Epenetos et al. |
| 11,033,133 B2 | 6/2021 | O'Hare et al. |
| 11,225,369 B2 | 1/2022 | Welle |
| 11,370,580 B2 | 6/2022 | Sharpe |
| 11,375,835 B2 | 7/2022 | Sherburne |
| 11,603,252 B2 * | 3/2023 | Liu .................... B65D 81/3869 |
| 2008/0190804 A1 * | 8/2008 | Blumenschein ... B65D 21/0233 |
| | | 206/509 |
| 2009/0071968 A1 * | 3/2009 | O'Brien ............ B65D 81/3825 |
| | | 220/592.2 |
| 2016/0150902 A1 | 6/2016 | Dokhanian et al. |
| 2017/0181556 A1 * | 6/2017 | Lai ........................ A47G 21/18 |
| 2017/0367536 A1 | 12/2017 | Wall |
| 2020/0172292 A1 * | 6/2020 | Serrahima ............ B65D 25/02 |
| 2023/0355037 A1 * | 11/2023 | Thorn ................ A47J 41/0077 |

* cited by examiner

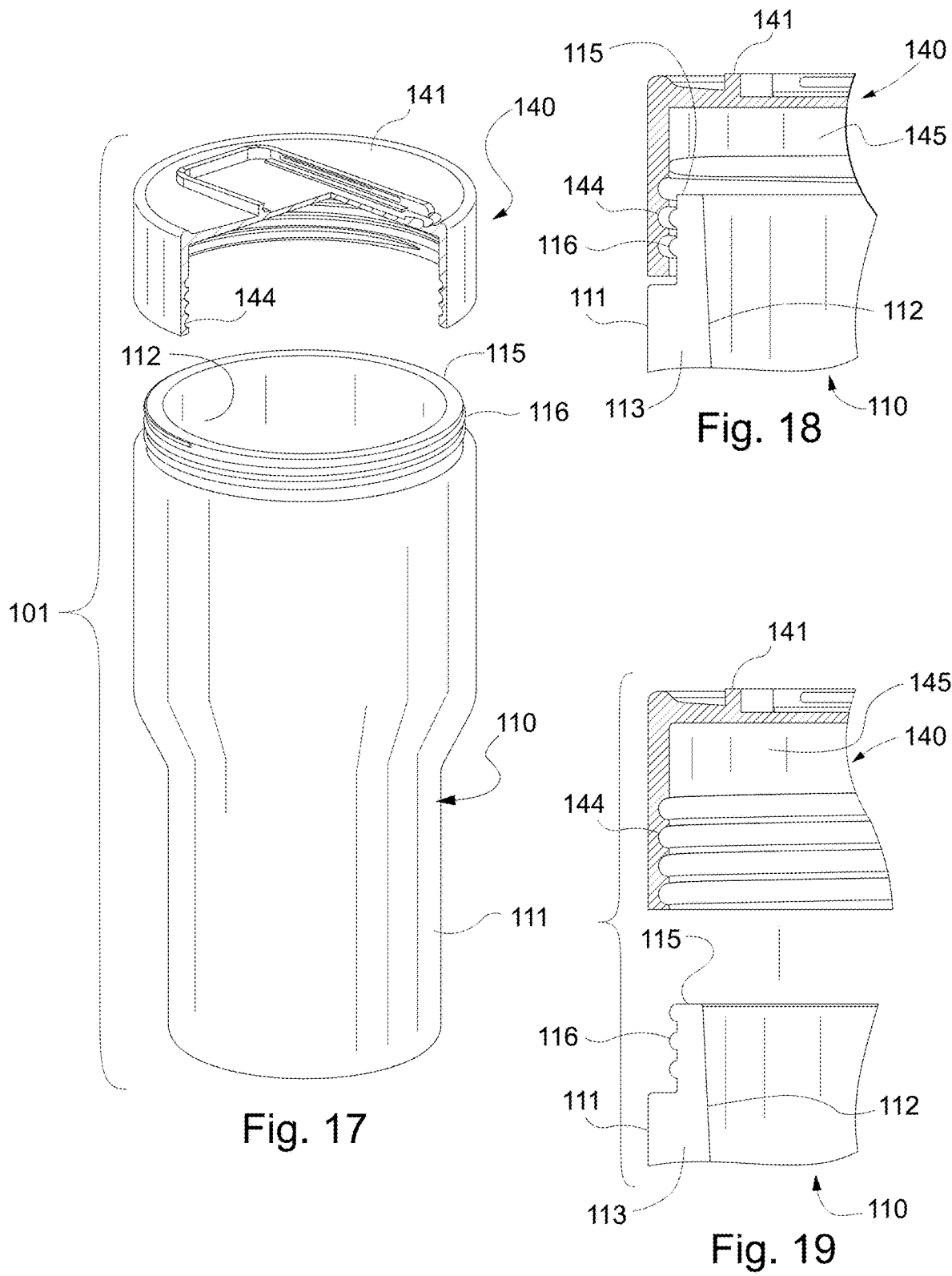

INSULATED FOOD AND/OR BEVERAGE CONTAINER SYSTEM

CROSS-REFERENCE TO RELATED APPLICATIONS

This patent application claims priority to, and incorporates by reference in its entirety, U.S. Provisional Patent Application No. 63/532,191, entitled "Insulated Food And/Or Beverage Container System", filed on Aug. 11, 2023.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to an insulated food and/or beverage container system. More particularly, the invention relates to an insulated food and/or beverage container system that includes an inner container that is configured to fit within an outer insulated container.

2. Background

Insulating containers have been popular for many years to keep food and beverages at a desired temperature for an extended period. Traditional and existing insulated containers (e.g., vacuum-sealed steel thermoses, travel mugs, etc.) are designed to insulate food and beverages that are poured or placed directly into the container. Typically, the user is required to wash the container between uses, which for many presents an undesirable requirement. Additionally, the need to wash between uses limits the versatility and convenience of the container, both within a single day or occasion, and from day to day. Further, the current products require the user to prepare the intended contents in a separate vessel prior to transferring them to the insulated container-resulting in additional user effort in both preparation and cleanup.

Therefore, what is needed is an insulated food and/or beverage container system that includes an inner container that covers an inner surface of a cylindrical body portion of an outer insulated container so as to prevent a food and/or the beverage from contacting the inner surface. Moreover, an insulated food and/or beverage container system is needed with an inner container that covers an inner surface of a cylindrical body portion of an outer insulated container so as to obviate a need for cleaning the food and/or the beverage from the inner surface of the cylindrical body portion. Furthermore, there is a need for an insulated food and/or beverage container system that includes an inner container that is able to fully and securely nest inside an outer insulated container without any spinning or significant rattling.

BRIEF SUMMARY OF EMBODIMENTS OF THE INVENTION

Accordingly, the present invention is directed to an insulated food and/or beverage container system that substantially obviates one or more problems resulting from the limitations and deficiencies of the related art.

In accordance with one or more embodiments of the present invention, there is provided an insulated food and/or beverage container system that includes an outer insulated container, the outer insulated container including a cylindrical body portion with an inner surface and an outer surface, the outer insulated container further including a removable outer container lid that is configured to sealingly engage with the cylindrical body portion so as to minimize thermal transfer with an outside environment; and an inner container configured to fit within the outer insulated container, the inner container defining an interior cavity for holding food and/or a beverage, the inner container including one or more first elements that are configured to matingly engage with one or more second elements on the cylindrical body portion of the outer insulated container so that the inner container is able to fully and securely nest inside the outer insulated container without any spinning or significant rattling. In these one or more embodiments, when the inner container is disposed within the outer insulated container, the outer insulated container and the inner container collectively provide enhanced insulating characteristics, and the inner container covers the inner surface of the cylindrical body portion of the outer insulated container so as to prevent the food and/or the beverage from contacting the inner surface, and thereby obviate a need for cleaning the food and/or the beverage from the inner surface of the cylindrical body portion.

In a further embodiment of the present invention, the one or more first elements of the inner container are selected from the group consisting of one or more slots, one or more grooves, one or more dimples, one or more channels, one or more protrusions, one or more ridges, one or more rails, and combinations thereof; and the one or more second elements of the outer insulated container are selected from the group consisting of one or more protrusions, one or more ridges, one or more rails, one or more dimples, one or more slots, one or more grooves, one or more channels, and combinations thereof. In this further embodiment, when the inner container is disposed within the outer insulated container, the inner container is configured to fit snugly within the outer insulated container at expected temperatures of use, while accommodating thermal expansion and/or contraction.

In yet a further embodiment, the one or more first elements of the inner container are in a form of one or more slots, and the one or more second elements of the outer insulated container are in a form of one or more protrusions that matingly engage with corresponding ones of the one or more slots in the inner container.

In still a further embodiment, the inner container further comprises an annular flange at an upper open end of the inner container and a removable inner container lid, the annular flange of the inner container being used for hermetic sealing of the inner container and as an anchor point for the removable inner container lid; and the inner container rests on and protrudes slightly above one or more outer walls of the outer insulated container so that the inner container is able to be easily grasped for removal by a user, and so the inner container lid is able to be removed or replaced easily while the inner container remains fully seated inside the outer insulated container.

In yet a further embodiment, the inner container further comprises an annular ledge below the annular flange at the upper open end of the inner container, and the outer insulated container further comprises a circumferential rim at an uppermost end of the outer insulated container. In this further embodiment, the annular ledge of the inner container rests on and partially or entirely covers the circumferential rim at the uppermost end of the outer insulated container, the annular ledge of the inner container functioning as a drip lip so as to prevent the food and/or a beverage in the interior cavity of the inner container from spilling over and onto the inner surface of the cylindrical body portion of the outer insulated container, and thereby obviate the need for cleaning the food and/or the beverage from the inner surface of the cylindrical body portion.

In still a further embodiment, the outer container lid of the outer insulated container seals tightly and fits over and around a top end portion of the outer insulated container, the outer container lid providing space for the nested inner container to be fully contained inside the outer insulated container despite resting on and protruding slightly above the circumferential rim at the uppermost end of the outer insulated container; and the outer container lid of the outer insulated container and the annular ledge of the inner container allows for a union between the outer and inner containers that prevents the food and/or a beverage in the interior cavity of the inner container from dripping or falling into and contaminating the inner surface of the outer insulated container while the inner container is nested inside the outer insulated container.

In yet a further embodiment, the top end portion of the outer insulated container further comprises a circumferential groove that receives a gasket member in the circumferential groove, the gasket member enabling the outer container lid of the outer insulated container to seal tightly with the cylindrical body portion of the outer insulated container.

In still a further embodiment, the top end portion of the outer insulated container further comprises a plurality of external threads that are configured to threadingly engage with a plurality of corresponding internal threads on the outer container lid of the outer insulated container.

In yet a further embodiment, the cylindrical body portion of the outer insulated container further comprises an outer wall with the outer surface, an inner wall with the inner surface, and a vacuum-sealed space in between the outer wall and the inner wall configured to provide an insulative cavity so as to minimize thermal transfer with the outside environment.

In still a further embodiment, the inner container is a food container with a removable inner container lid that is configured to safely contain food while the food is being heated in a microwave, and while the inner container is being stored and insulated within the outer insulated container.

In accordance with one or more other embodiments of the present invention, there is provided an insulated food and/or beverage container system that includes an outer insulated container, the outer insulated container including a cylindrical body portion with an inner surface and an outer surface, the outer insulated container further including a removable outer container lid that is configured to sealingly engage with the cylindrical body portion so as to minimize thermal transfer with an outside environment; and the outer insulated container further includes one or more first elements on the cylindrical body portion thereof that are configured to matingly engage with one or more second elements on an inner container so that the inner container is able to fully and securely nest inside the outer insulated container without any spinning or significant rattling.

In a further embodiment of the present invention, the insulated food and/or beverage container system further comprises the inner container configured to fit within the outer insulated container, the inner container defining an interior cavity for holding food and/or a beverage. In this further embodiment, when the inner container is disposed within the outer insulated container, the outer insulated container and the inner container collectively provide enhanced insulating characteristics, and the inner container covers the inner surface of the cylindrical body portion of the outer insulated container so as to prevent the food and/or the beverage from contacting the inner surface, and thereby obviate a need for cleaning the food and/or the beverage from the inner surface of the cylindrical body portion.

In yet a further embodiment, the inner container further comprises an annular flange at an upper open end of the inner container and a removable inner container lid, the annular flange of the inner container being used for hermetic sealing of the inner container and as an anchor point for the removable inner container lid; and the inner container rests on and protrudes slightly above one or more outer walls of the outer insulated container so that the inner container is able to be easily grasped for removal by a user, and so the inner container lid is able to be removed or replaced easily while the inner container remains fully seated inside the outer insulated container.

In still a further embodiment, the inner container further comprises an annular ledge below the annular flange at the upper open end of the inner container, and the outer insulated container further comprises a circumferential rim at an uppermost end of the outer insulated container; and the annular ledge of the inner container rests on and partially or entirely covers the circumferential rim at the uppermost end of the outer insulated container, the annular ledge of the inner container functioning as a drip lip so as to prevent the food and/or a beverage in the interior cavity of the inner container from spilling over and onto the inner surface of the cylindrical body portion of the outer insulated container, and thereby obviate the need for cleaning the food and/or the beverage from the inner surface of the cylindrical body portion.

In yet a further embodiment, the outer container lid of the outer insulated container seals tightly and fits over and around a top end portion of the outer insulated container, the outer container lid providing space for the nested inner container to be fully contained inside the outer insulated container despite resting on and protruding slightly above the circumferential rim at the uppermost end of the outer insulated container; and the outer container lid of the outer insulated container and the annular ledge of the inner container allows for a union between the outer and inner containers that prevents the food and/or a beverage in the interior cavity of the inner container from dripping or falling into and contaminating the inner surface of the outer insulated container while the inner container is nested inside the outer insulated container.

In accordance with yet one or more other embodiments of the present invention, there is provided an insulated food and/or beverage container system that includes an inner container configured to fit within an outer insulated container, the inner container defining an interior cavity for holding food and/or a beverage, the inner container including one or more first elements that are configured to matingly engage with one or more second elements on a cylindrical body portion of the outer insulated container so that the inner container is able to fully and securely nest inside the outer insulated container without any spinning or significant rattling; and the inner container further includes a removable inner container lid that is configured to safely contain the food and/or the beverage while the food and/or the beverage is being heated in a microwave, and while the inner container is being stored and insulated within the outer insulated container.

In a further embodiment of the present invention, the insulated food and/or beverage container system further comprises the outer insulated container, the outer insulated container including the cylindrical body portion with an inner surface and an outer surface, the outer insulated container further including a removable outer container lid that is configured to sealingly engage with the cylindrical body portion so as to minimize thermal transfer with an outside environment. In this further embodiment, when the inner container is disposed within the outer insulated container, the outer insulated container and the inner container collectively provide enhanced insulating characteristics, and the inner container covers the inner surface of the cylindrical body portion of the outer insulated container so as to prevent the food and/or the beverage from contacting the inner surface, and thereby obviate a need for cleaning the food and/or the beverage from the inner surface of the cylindrical body portion.

In yet a further embodiment, the inner container further comprises an annular flange at an upper open end of the inner container and a removable inner container lid, the annular flange of the inner container being used for hermetic sealing of the inner container and as an anchor point for the removable inner container lid; and the inner container rests on and protrudes slightly above one or more outer walls of the outer insulated container so that the inner container is able to be easily grasped for removal by a user, and so the inner container lid is able to be removed or replaced easily while the inner container remains fully seated inside the outer insulated container.

In still a further embodiment, the inner container further comprises an annular ledge below the annular flange at the upper open end of the inner container, and the outer insulated container further comprises a circumferential rim at an uppermost end of the outer insulated container; and the annular ledge of the inner container rests on and partially or entirely covers the circumferential rim at the uppermost end of the outer insulated container, the annular ledge of the inner container functioning as a drip lip so as to prevent the food and/or a beverage in the interior cavity of the inner container from spilling over and onto the inner surface of the cylindrical body portion of the outer insulated container, and thereby obviate the need for cleaning the food and/or the beverage from the inner surface of the cylindrical body portion.

In yet a further embodiment, the outer container lid of the outer insulated container seals tightly and fits over and around a top end portion of the outer insulated container, the outer container lid providing space for the nested inner container to be fully contained inside the outer insulated container despite resting on and protruding slightly above the circumferential rim at the uppermost end of the outer insulated container; and the outer container lid of the outer insulated container and the annular ledge of the inner container allows for a union between the outer and inner containers that prevents the food and/or a beverage in the interior cavity of the inner container from dripping or falling into and contaminating the inner surface of the outer insulated container while the inner container is nested inside the outer insulated container.

In still a further embodiment, the one or more first elements of the inner container are disposed on a bottom end portion of the inner container.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 17 is a top-side perspective view of an outer insulated container of an insulated food and/or beverage container system, according to another illustrative embodiment of the invention, wherein an outer container lid of the outer insulated container is shown removed from the cylindrical body portion of the outer insulated container;

FIG. 18 is a partial assembled cross-sectional view of the outer insulated container of the insulated food and/or beverage container system of FIG. 17; and FIG. 19 is a partial exploded cross-sectional view of the outer insulated container of the insulated food and/or beverage container system of FIG. 17, wherein the outer container lid of the outer insulated container is shown removed from the cylindrical body portion of the outer insulated container.

Throughout the figures, the same parts are always denoted using the same reference characters so that, as a general rule, they will only be described once.

DETAILED DESCRIPTION OF EMBODIMENTS OF THE INVENTION

Figure 1:
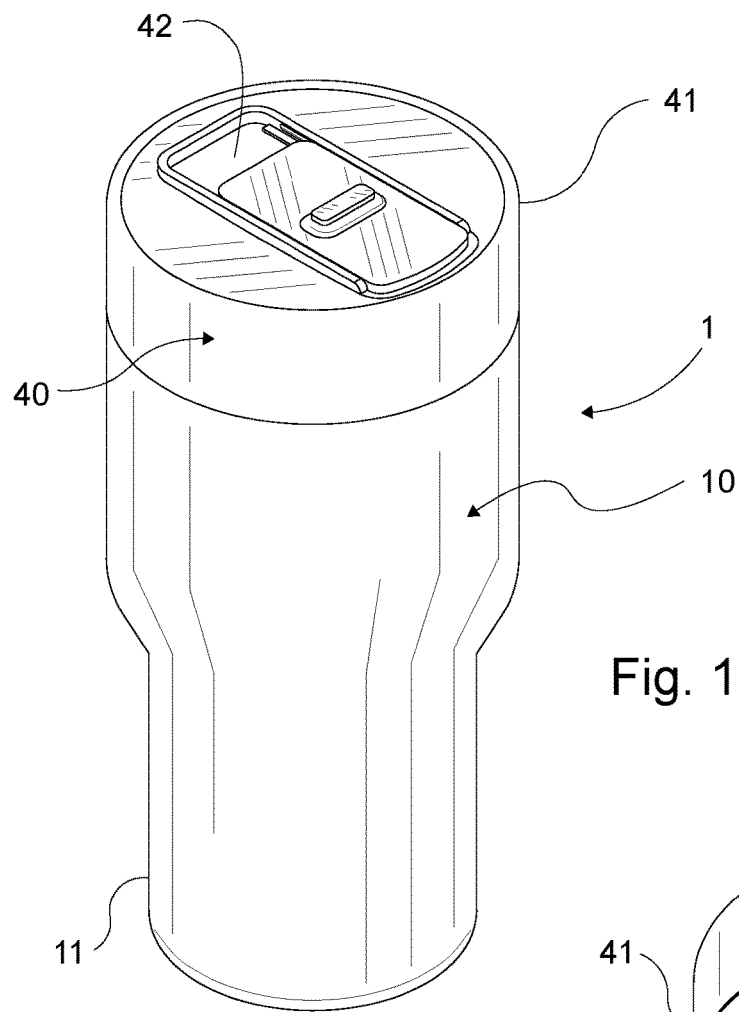
FIG. 1 is a top-side perspective view of an insulated food and/or beverage container system, according to one illustrative embodiment of the invention.
Figure 2:
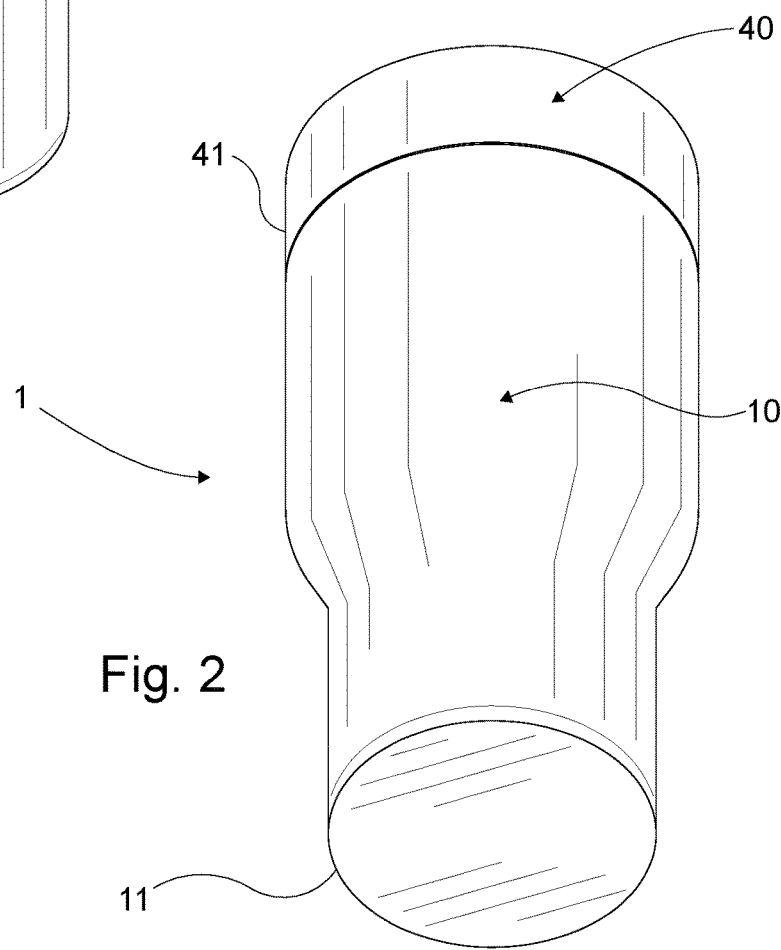
FIG. 2 is a bottom-side perspective view of the insulated food and/or beverage container system of FIG. 1.
Figure 3:
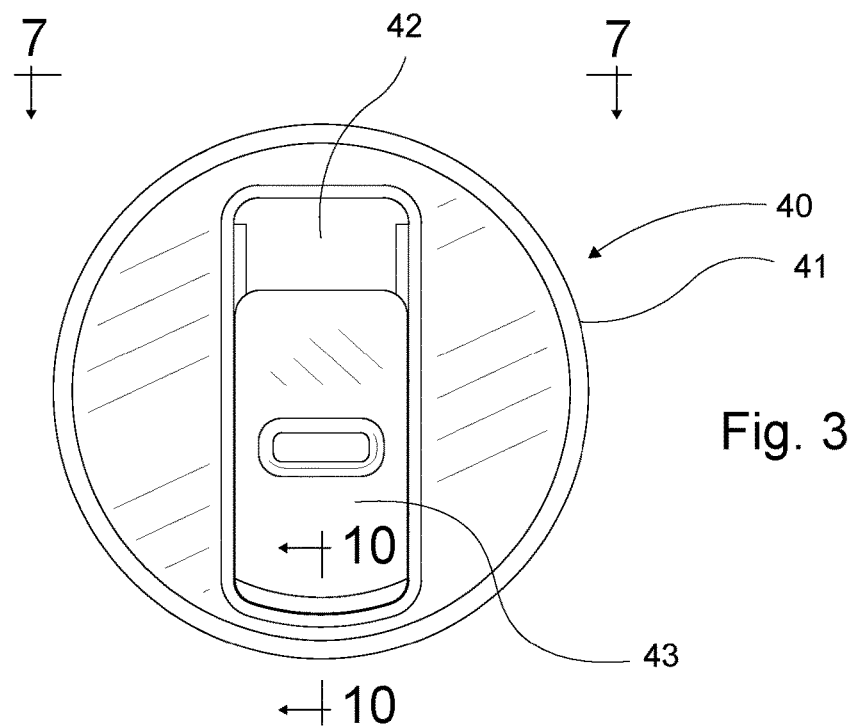
FIG. 3 is a top plan view of the insulated food and/or beverage container system of FIG. 1.
Figure 4:
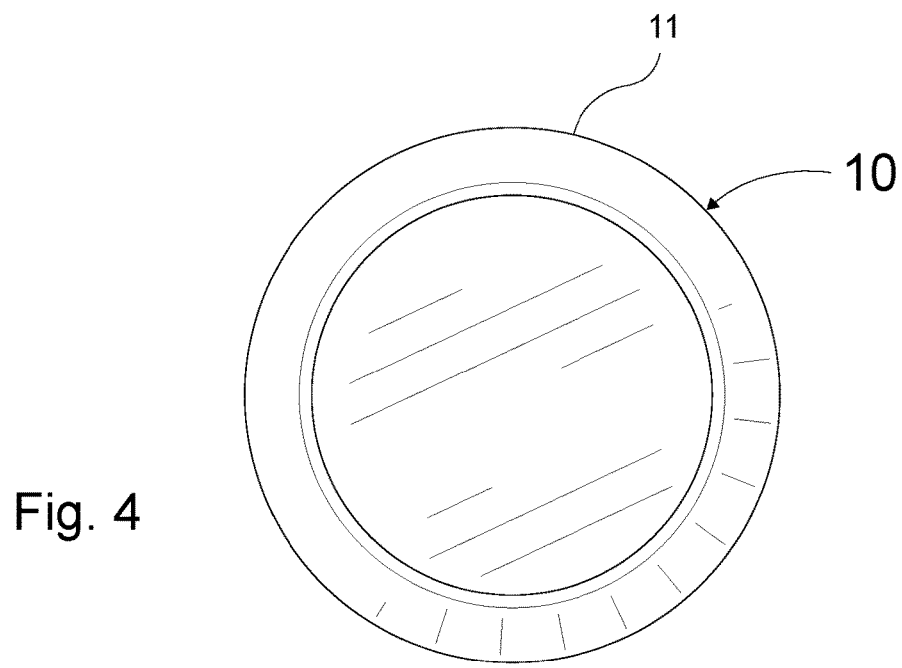
FIG. 4 is a bottom plan view of the insulated food and/or beverage container system of FIG. 1.
Figure 5:
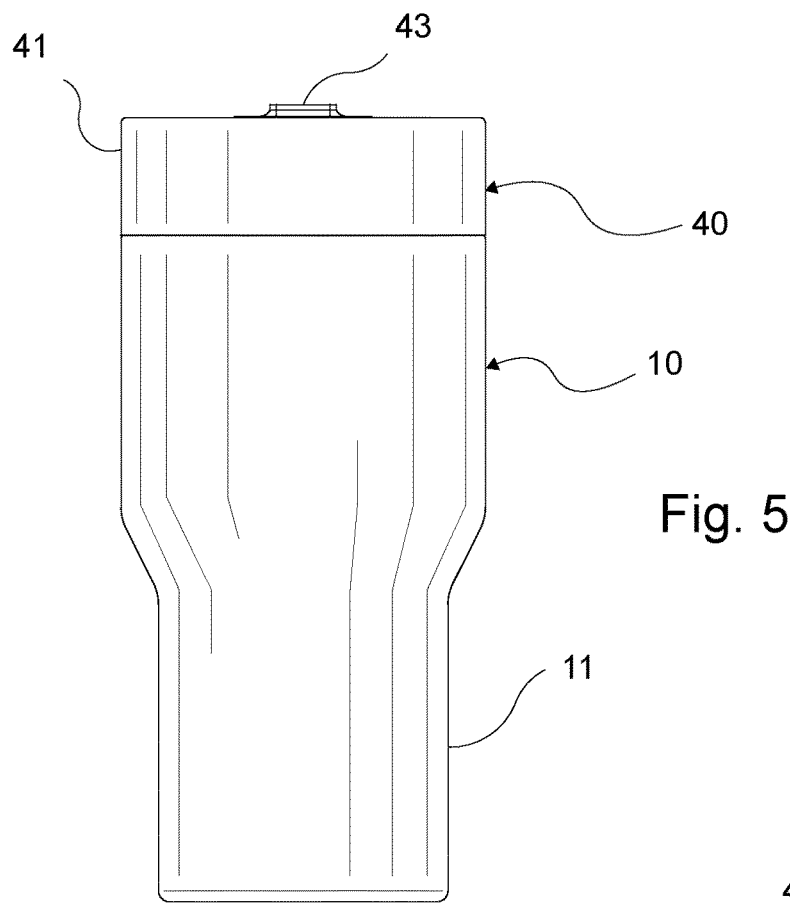
FIG. 5 is a front elevational view of the insulated food and/or beverage container system of FIG. 1.
Figure 6:
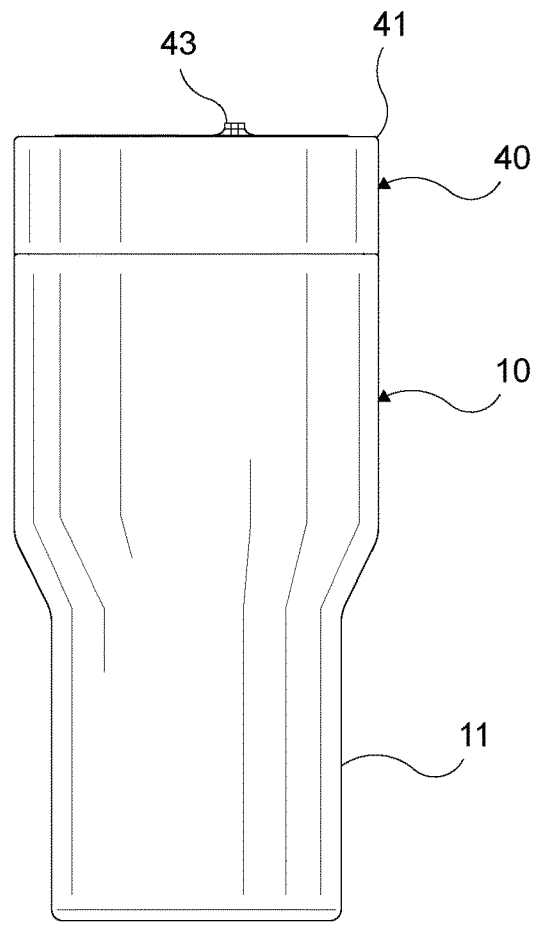
FIG. 6 is a side elevational view of the insulated food and/or beverage container system of FIG. 1.

An illustrative embodiment of an insulated food and/or beverage container system is seen generally at 1 in FIGS. 1, 2, 7, 8, and 11. With initial reference to FIGS. 1 and 11, it can be seen that the insulated food and/or beverage container system 1 generally comprises an outer insulated container 10, the outer insulated container 10 including a cylindrical body portion with an inner surface 12 and an outer surface 11, the outer insulated container 10 further including a removable outer container lid 40 that is configured to sealingly engage with the cylindrical body portion so as to minimize thermal transfer with an outside environment; and an inner container 20 configured to fit within the outer insulated container 10, the inner container 20 defining an interior cavity for holding food and/or a beverage 25, the inner container 20 including one or more first elements 22 that are configured to matingly engage with one or more second elements 14 on the cylindrical body portion of the outer insulated container 10 so that the inner container 20 is able to fully and securely nest inside the outer insulated container 10 without any spinning or significant rattling. In the illustrative embodiment, when the inner container 20 is disposed within the outer insulated container 10, the outer insulated container 10 and the inner container 20 collectively provide enhanced insulating characteristics, and the inner container 20 covers the inner surface 12 of the cylindrical body portion of the outer insulated container 10 so as to prevent the food and/or the beverage 25 from contacting the inner surface 12, and thereby obviate a need for cleaning the food and/or the beverage 25 from the inner surface 12 of the cylindrical body portion.

Figure 7:
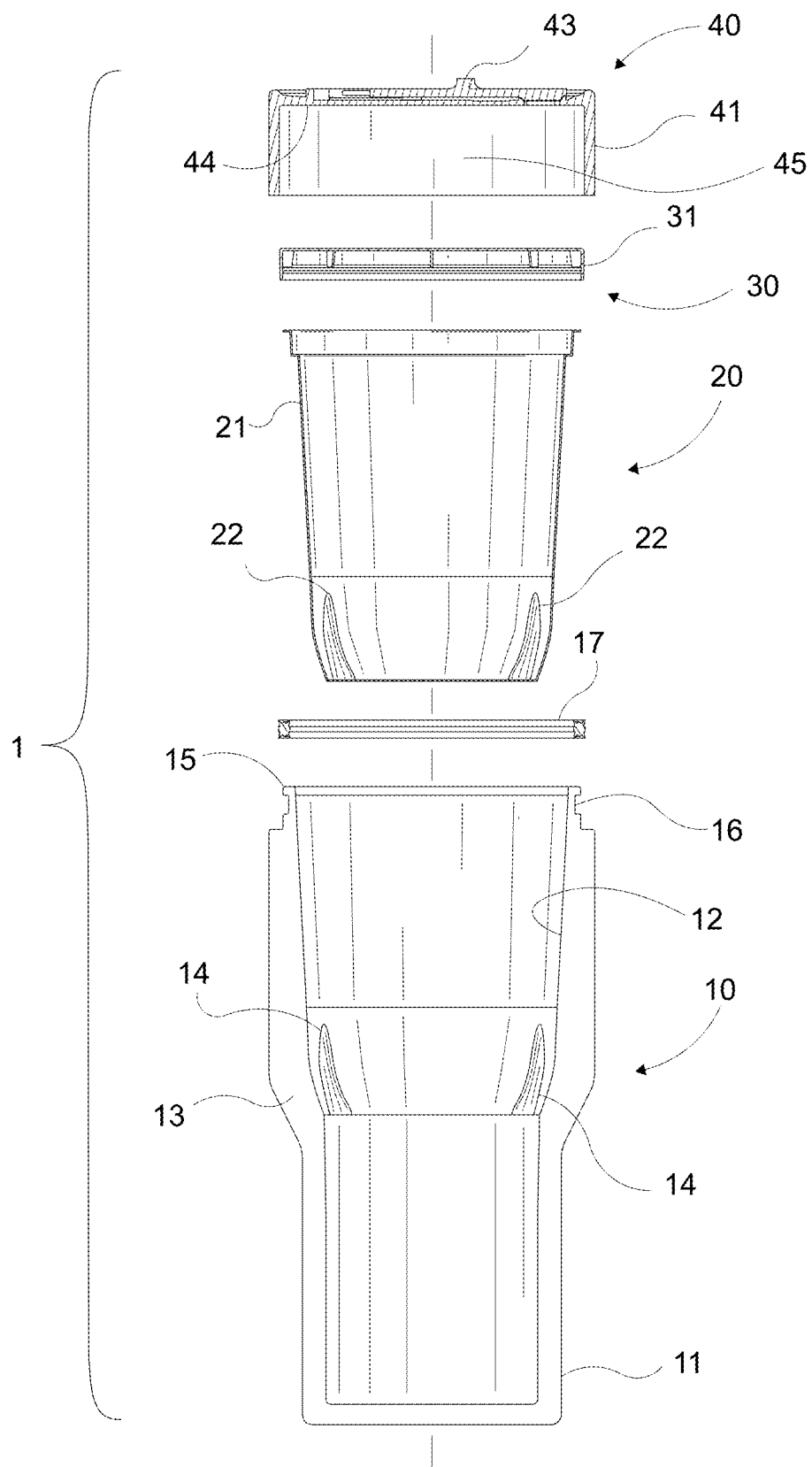
FIG. 7 is an exploded cross-sectional view of the insulated food and/or beverage container system of FIG. 1, wherein the section is taken based on the section line 7-7 in FIG. 3.
Figure 11:
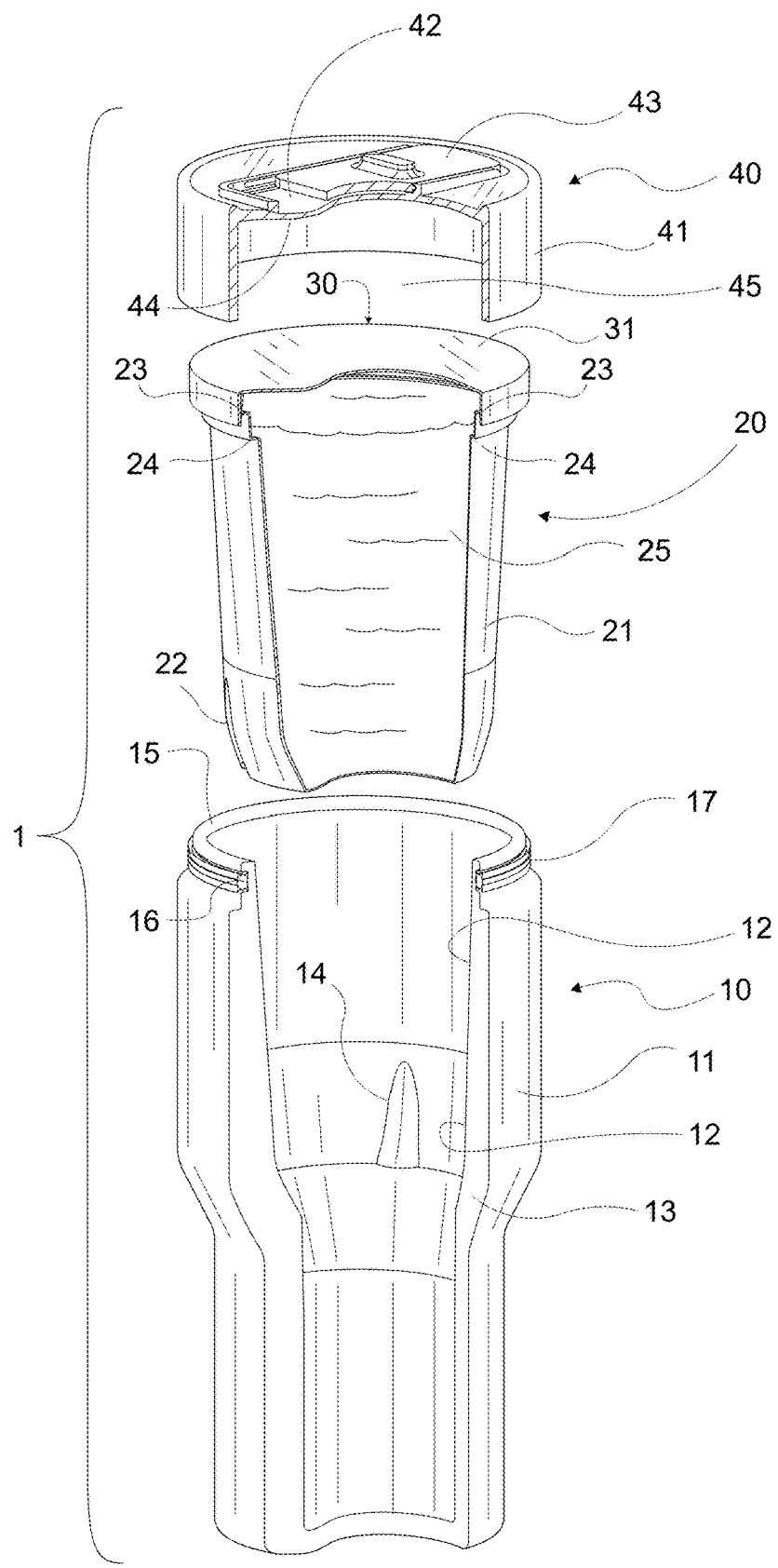
FIG. 11 is an exploded cut-away perspective view of the insulated food and/or beverage container system of FIG. 1.
Figure 12:
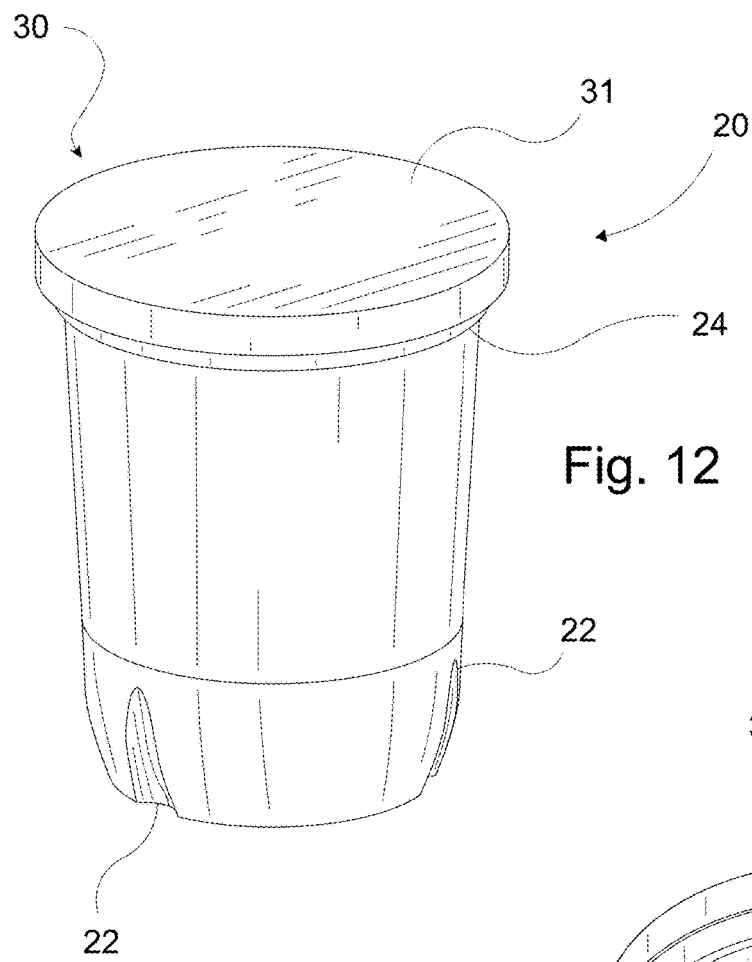
FIG. 12 is a top-side perspective view of the inner container of the insulated food and/or beverage container system of FIG. 1.
Figure 13:
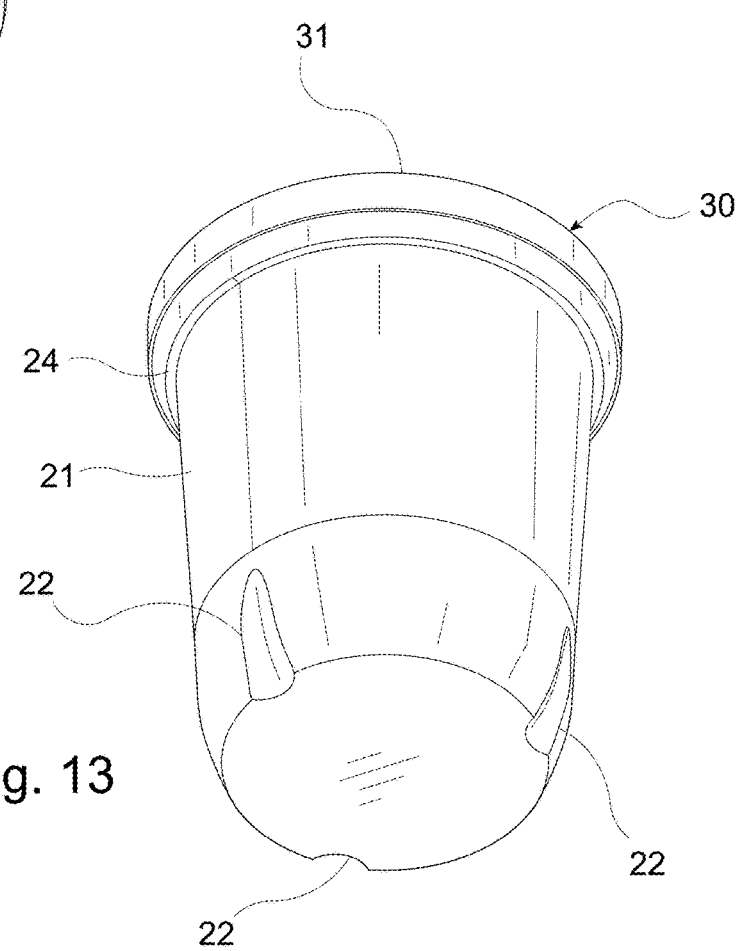
FIG. 13 is a bottom-side perspective view of the inner container of the insulated food and/or beverage container system of FIG. 1.
Figure 14:
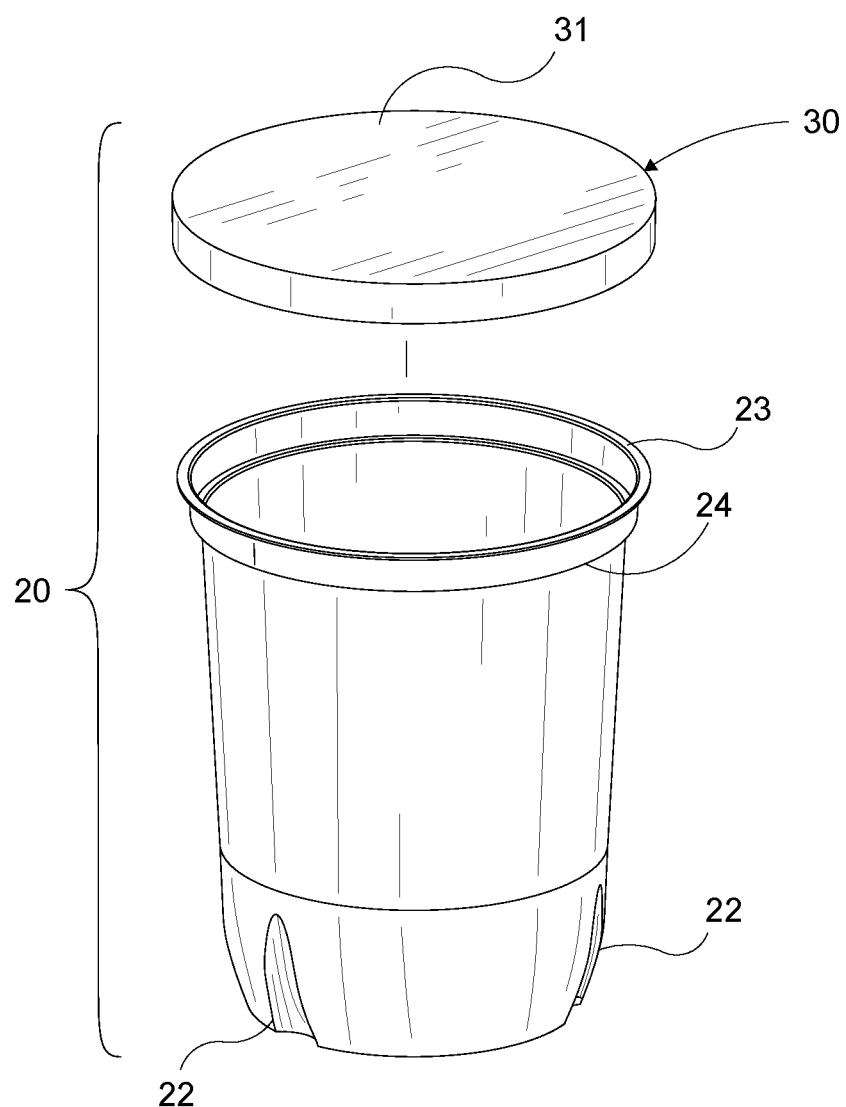
FIG. 14 is another top-side perspective view of the inner container of the insulated food and/or beverage container system of FIG. 1, wherein the inner container lid is shown removed from the remainder of the inner container.
Figure 15:
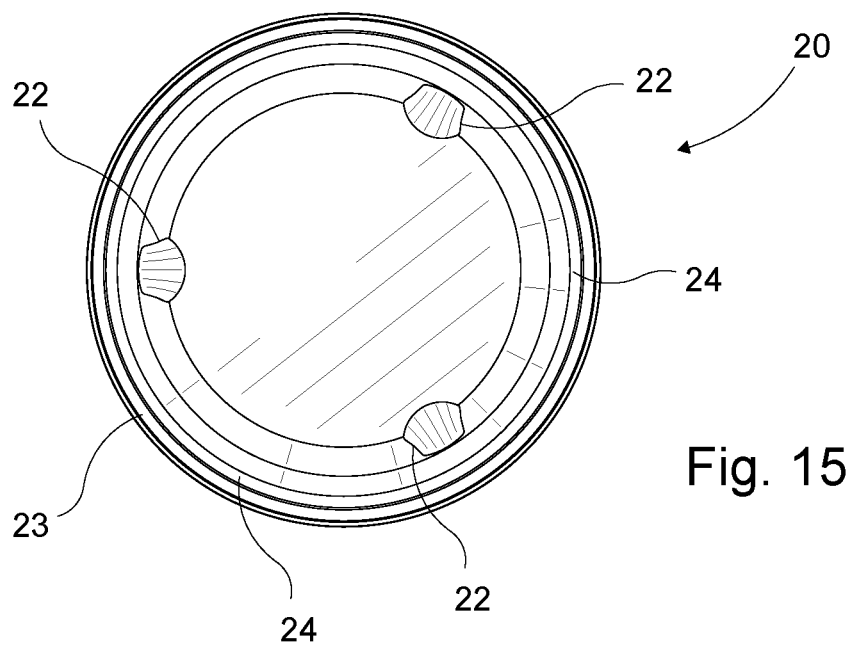
FIG. 15 is a bottom plan view of the inner container of the insulated food and/or beverage container system of FIG. 12.
Figure 16:
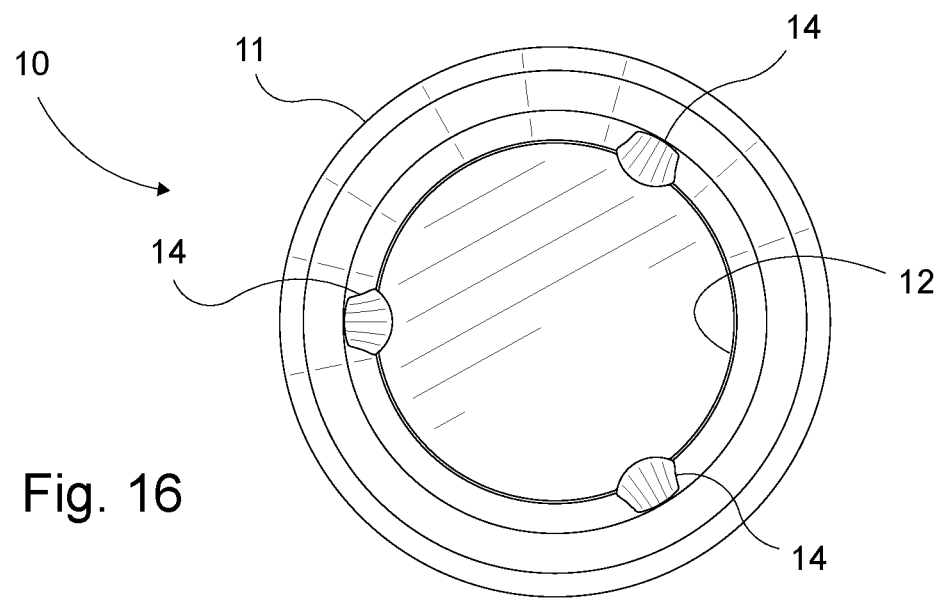
FIG. 16 is a top plan view of the outer insulated container of the insulated food and/or beverage container system of FIG. 1, wherein the outer container lid has been removed from the remainder of the outer insulated container.

Referring collectively to FIGS. 7, 11, and 12 of the illustrative embodiment, it can be seen that the one or more first elements 22 of the inner container 20 are in a form of a plurality of slots, and the one or more second elements 14 of the outer insulated container 10 are in a form of a plurality of protrusions that matingly engage with corresponding ones of the plurality of slots in the inner container 20. For example, as shown in FIGS. 15 and 16 of the illustrative embodiment, the outer insulated container 10 may comprise three (3) circumferentially spaced-apart elongate protrusions 14 (e.g., spaced approximately 120 degrees apart from one another) that are configured to engage with respective circumferentially spaced-apart elongate slots 22 in the inner container 20 (e.g., where the slots 22, similar to the protrusions 14, are spaced approximately 120 degrees apart from one another). As best shown in FIGS. 11-13, in the illustrative embodiment, the elongate protrusions 14 have curved cross-sections that correspond to the curved cross-sections of the elongate slots 22. When the inner container 20 is disposed within the outer insulated container 10, the inner container 20 is configured to fit snugly within the outer insulated container 10 at expected temperatures of use, while accommodating thermal expansion and/or contraction.

In one or more other embodiments, rather than being in a form of elongate slots, the one or more first elements of the inner container 20 may comprise one or more grooves, one or more dimples, one or more channels, one or more protrusions, one or more ridges, one or more rails, and/or combinations thereof. Also, in these one or more other embodiments, rather than being in a form of protrusions, the one or more second elements of the outer insulated container 10 may comprise one or more ridges, one or more rails, one or more dimples, one or more slots, one or more grooves, one or more channels, and/or combinations thereof.

Turning to FIGS. 9-11 and 14, in the illustrative embodiment, it can be seen that the inner container 20 further comprises an annular flange 23 at an upper open end of the inner container 20 and a removable inner container lid 30. The annular flange 23 of the inner container 20 is used for hermetic sealing of the inner container 20 and as an anchor point for the removable inner container lid 30. When the inner container 20 is disposed within the outer insulated container 10, the inner container 20 rests on and protrudes slightly above circular outer wall of the outer insulated container 10 (see FIGS. 8 and 9) so that the inner container 20 is able to be easily grasped for removal by a user, and so the inner container lid 30 is able to be removed or replaced easily while the inner container 20 remains fully seated inside the outer insulated container 10.

Also, in the illustrative embodiment, with reference to FIGS. 8-11, the inner container 20 further comprises an annular ledge 24 below the annular flange 23 at the upper open end of the inner container 20, and the outer insulated container 10 further comprises a circumferential rim 15 at an uppermost end of the outer insulated container 10. In the illustrative embodiment, as shown in FIG. 9, when the inner container 20 is disposed within the outer insulated container 10, the annular ledge 24 of the inner container 20 rests on and partially or entirely covers the circumferential rim 15 at the uppermost end of the outer insulated container 10. The annular ledge 24 of the inner container 20 is configured to function as a drip lip so as to prevent the food and/or a beverage in the interior cavity of the inner container 20 from spilling over and onto the inner surface 12 of the cylindrical body portion of the outer insulated container 10, and thereby obviate the need for cleaning the food and/or the beverage from the inner surface 12 of the cylindrical body portion of the outer insulated container 10.

In the illustrative embodiment, as shown in FIGS. 1 and 9, the outer container lid 40 of the outer insulated container 10 seals tightly and fits over and around a top end portion of the outer insulated container 10. The outer container lid 40 provides space for the nested inner container 20 to be fully contained inside the outer insulated container 10 despite resting on and protruding slightly above the circumferential rim 15 at the uppermost end of the outer insulated container 10. In the illustrative embodiment, the outer container lid 40 of the outer insulated container 10 and the annular ledge 24 of the inner container 20 allows for a union between the outer and inner containers 10, 20 that prevents the food and/or a beverage in the interior cavity of the inner container 20 from dripping or falling into and contaminating the inner surface 12 of the outer insulated container 10 while the inner container 20 is nested inside the outer insulated container 10.

Figure 8:
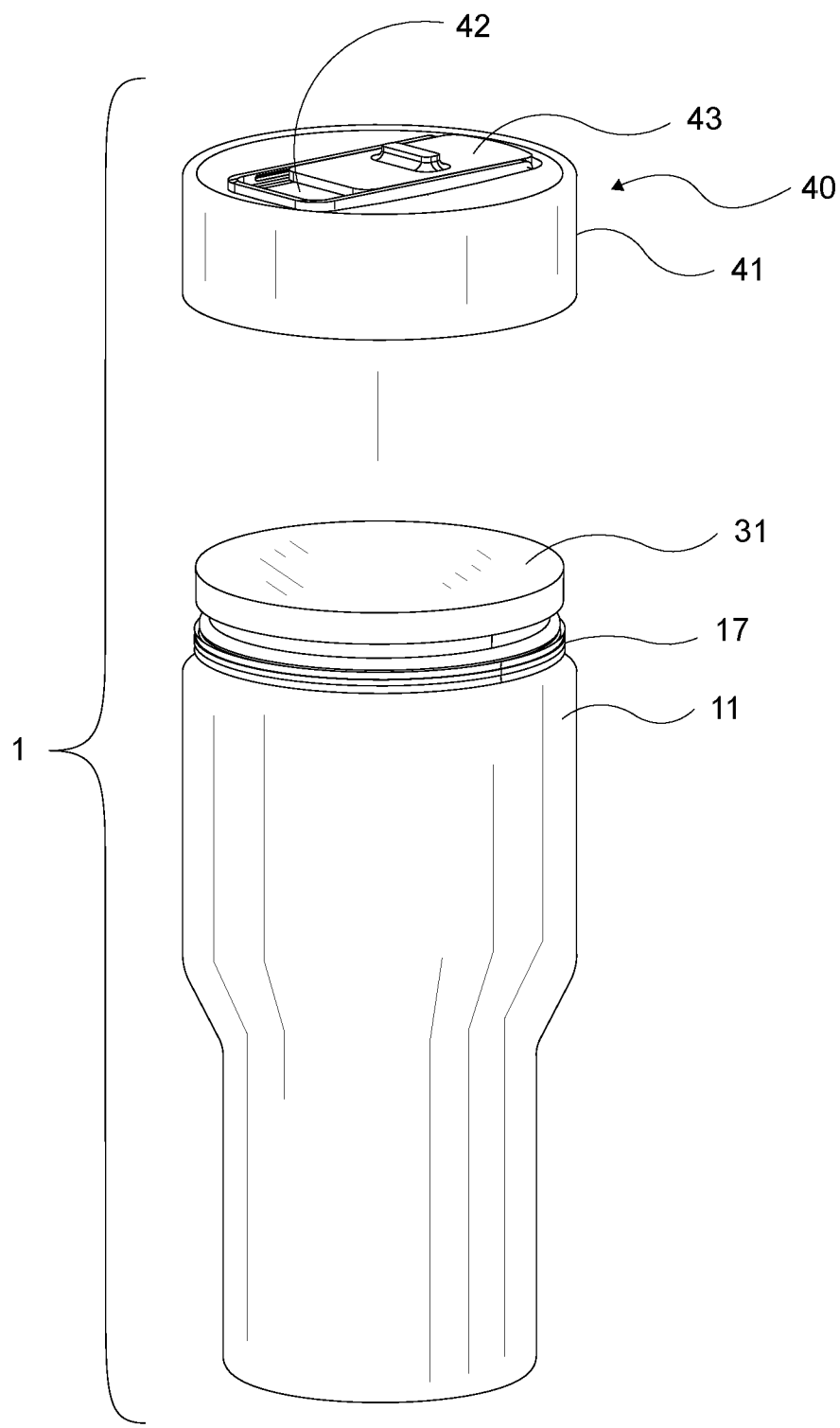
FIG. 8 is another top-side perspective view of the insulated food and/or beverage container system of FIG. 1, wherein the outer container lid is shown removed from the remainder of the container system.
Figure 9:
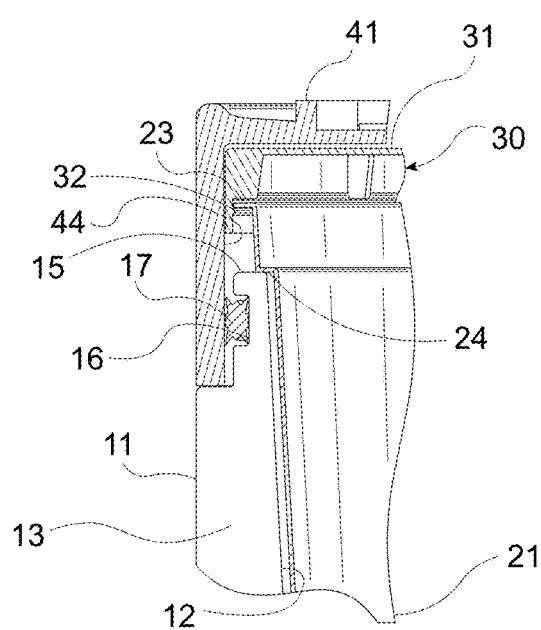
FIG. 9 is a partial assembled cross-sectional view of the insulated food and/or beverage container system of FIG. 1.

Referring to FIGS. 7-11, in the illustrative embodiment, the top end portion of the outer insulated container 10 further comprises a circumferential groove 16 that receives a gasket member 17 in the circumferential groove 16. The gasket member 17 enables the outer container lid 40 of the outer insulated container 10 to seal tightly with the cylindrical body portion of the outer insulated container 10. Also, as shown in the illustrative embodiment of FIGS. 7-11, the outer container lid 40 has an outer surface 41, an inner sealing surface 44, and a food container cavity 45 for accommodating the protruding top end portion of the inner container 20. In addition, as best shown in FIGS. 8 and 11, the outer container lid 40 has a sip hole sliding cover 43 that is able to be used by a user to selectively open and close the sip hole 42 in the outer container lid 40.

Figure 10:
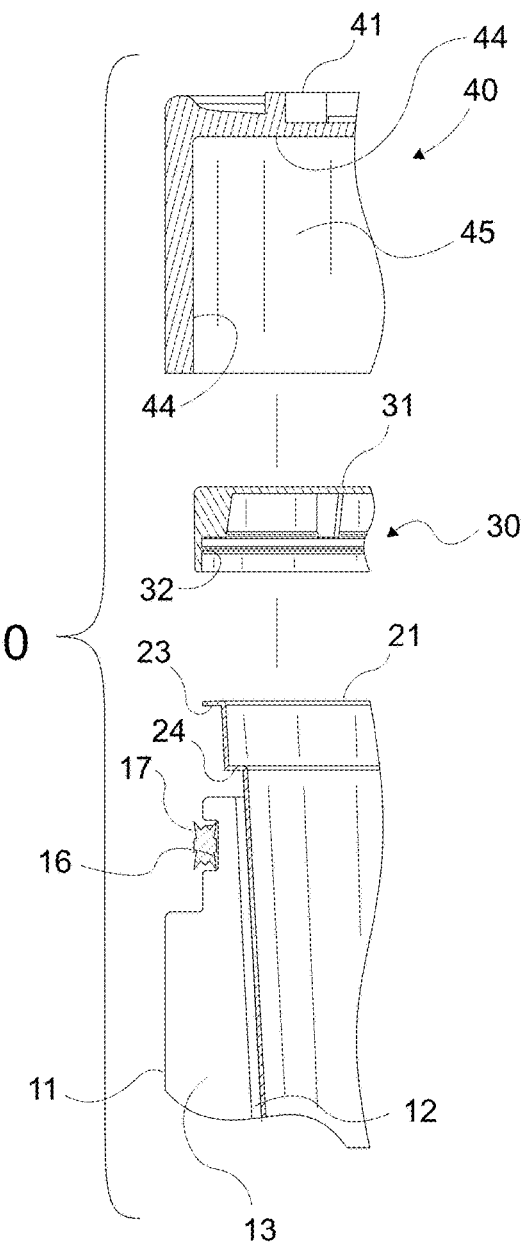
FIG. 10 is a partial exploded cross-sectional view of the insulated food and/or beverage container system of FIG. 1, wherein the section is taken based on the section line 10-10 in FIG. 3.

In the illustrative embodiment, as shown in FIGS. 7, 10, and 11, the cylindrical body portion of the outer insulated container 10 further comprises an outer wall with the outer surface 11, an inner wall with the inner surface 12, and a vacuum-sealed space or cavity 13 in between the outer wall and the inner wall configured to provide an insulative cavity so as to minimize thermal transfer with the outside environment.

With combined reference to FIGS. 7 and 11-14, it can be seen that, in the illustrative embodiment, the inner container 20 is a food container with a removable inner container lid 30 that is configured to safely contain food 25 (e.g., soup) while the food 25 is being heated in a microwave, and while the inner container 20 is being stored and insulated within the outer insulated container 10. As shown in FIGS. 7 and 11, the inner container 20 has an outer surface 21, while the removable inner container lid 30 has an outer surface 31. In the illustrative embodiment, referring to the sectional views of FIGS. 9 and 10, the removable inner container lid 30 has an annular attachment ridge 32 such that the inner container lid 30 is able to snap onto the annular flange 23 at the upper open end of the inner container 20.

In one or more embodiments, the insulated food and/or beverage container system 1 is a two-part system that includes a multi-functional insulating beverage container 10 that is designed to securely contain and insulate removable/disposable microwaveable meal containers 20. The first part relates to an insulating food and beverage container 10, particularly a double-wall insulated container, which is specifically designed to accept, secure, and fully contain a second independent container 20 holding heated food. The second part, the inner lidded container 20, is specifically designed to nest securely inside the insulating container 10 while the insulating container is closed with a lid 40. In these one or more embodiments, the inner container 20 is a microwave-safe container designed to hold food contents while heated and while stored within or consumed from the insulating outer container 10. The inner container 20 may contain ready-to-heat food products or may be delivered empty and filled with home-prepared items. Also, the inner container 20 may be disposable or reusable. Together as a system, the two containers 10, 20 achieve superior insulating performance compared to a singular container, while also keeping that same outer insulating container 10 clean and thus available for immediate reuse or alternative use (e.g., as a travel coffee mug), unlike existing containers.

In one or more embodiments, the insulated food and/or beverage container system 1 is a two-part integrated system that delivers superior performance, convenience and functionality compared to what the existing insulated container products and existing microwaveable meals provide separately. This system 1 enables users to consume meals similar to existing "heat and eat" microwave meals with more flexibility of where and when they can be heated and still enjoyed warm at a later time or distant location. The user can heat the microwaveable meal in its original container and place that entire container 20 securely inside the outer insulating container 10. This nesting system enables the user to eat the meal warm over an extended time window without contaminating the outer insulating container 10 with food. After consumption, the inner container 20 can be removed/discarded, and the outer insulating container 10 can be used again without additional preparation or cleaning (e.g., for coffee), or stored clean and reused at a later occasion for the next meal.

In one or more embodiments, the two-part system 1 includes an insulating container 10 and a separate independent, but complimentary inner food container 20. The outer insulating container 10 includes a cylindrical body that is made of a durable and insulating material, such as stainless steel or plastic. The body includes an inner layer and an outer layer, with a vacuum-sealed space in between that provides insulating properties. The container 10 also includes a lid 40 that seals tightly to minimize any heat transfer to the outside environment. The body of the container 10 is designed to accept specifically complimentary containers 20, primarily that contain heated food, such that they insert fully and securely. The lid 40 of the outer insulating container 10 secures to the body in a way that allows space for the inner chamber to fully contain the lidded food vessel 20 that nests inside.

In these one or more embodiments, the inner food container 20 is shaped to fit snugly and securely inside the outer insulating container 10. The inner food container 20 is constructed of food safe and microwave safe material and can be sold empty or containing microwaveable food. The inner container 20 has a special "drip lip" 24 toward the top of the inner container 20 and below where the lid 31 fastens, which prevents the contents of the inner container 20 from being spilled or dripped onto any interior surface 12 of the outer container 10 during normal use. This important design feature allows the user to reuse the outer insulating container 10, as a coffee mug for example, without the need to wash it. This design feature also makes it necessary for the outer insulating container lid 40 to secure around the outside of the top rather than plugging down into the container-a design that is not the common convention. The result of these features is that the food container 20 can be fully contained and insulated then removed after use with no mess left behind.

In one or more embodiments, an integrated insulated food storage system 1 is provided that comprises two independent but complimentary components 10, 20. The first component is an insulating food and beverage container 10 comprising a cylindrical body made of a durable and insulating material, with an inner layer, an outer layer, and a vacuum-sealed space 13 in between, as well as a lid 40 which seals tightly to the body to minimize thermal transfer with the outside environment. This insulating container 10 incorporates surfaces inside the container body that are specifically complimentary to the second component, which is a food container 20 designed to nest fully and securely inside without the ability to spin or shake/rattle excessively. The food container 20 is a disposable or reusable lidded container that is capable of safely containing food while heated in a microwave and while stored and insulated within the outer container 10. Together, the two containers 10, 20 nest securely and provide enhanced convenience as well as insulation characteristics.

In these one or more embodiments, the inside surface 12 of the outer insulating container body incorporates one or more slots, grooves, ridges, rails, dimples, channels, or other mechanisms that are specifically complimentary to the slots, grooves, ridges, rails, dimples, channels, or other mechanisms of the inner food container 20, which is designed to nest fully and to securely interlock without the ability to spin or shake/rattle excessively. The food container 20 is also shaped and sized to insert and fit snugly within the outer insulating container 10 at expected temperatures of use, with consideration of thermal expansion and/or contraction.

In these one or more embodiments, the disposable or reusable independent food container 20 incorporates design features described above so as to enable the container 20 to nest within the insulating food and beverage container 10. The inner food container 20 incorporates a flange 23 at the upper open end as well as a distinct horizontal ledge 24 immediately below it at the upper open end of the generally cylindrical food container 20. The flange 23 is used for hermetic sealing of the inner food container 20 and as an anchor point for the removable inner container lid 30. Importantly, the inner container 20 rests on and protrudes slightly above the outer walls of the insulating outer container 10 so that it can be easily grasped for removal and so the inner container lid 30 can be removed or replaced easily while the food container 20 remains fully seated inside the outer insulating container 10. This characteristic is facilitated by the horizontal ledge 24 below the upper flange 23, which rests on and partially or entirely covers the top-most horizontal circumferential surface 15 of the outer insulating container 10 (see e.g., FIG. 9). This ledge, referred to as the "drip lip" 24, also prevents any contents from the food container 20 from spilling over and into the insulating food and beverage container, eliminating the need to wash the outer container 10 before follow-on use as a beverage container or an additional meal occasion.

In these one or more embodiments, the integrated insulated food storage system 1 further comprises a lid 40 for the outer insulating container 10 that seals tightly and fits over and around the exterior top of the insulating container 10. The lid 40 seals to the body with a gasket 17 made of rubber, plastic, or similar material which is seated around the outer circumference of the insulating container 10. This design detail is a meaningful departure from common practice of an external screw-on cap or an internally inserted lid. The external lid 40 provides space for the nested interior container 20 to be fully contained inside despite resting on and protruding slightly above topmost horizontal surface 15 of the cylinder body of the insulating container 10, as described above. The combination of the externally placed lid 40 on the outer container 10 with the "drip lip" 24 of the inner container 20 allows for a union between the two containers 10, 20 that prevents the contents of the inner container 20 from dripping or falling into and contaminating any inner surface 12 of the insulating container 10 while the inner container 20 is nested inside the insulating container 10. This performance specification cannot be achieved with a lid that inserts into the top of the outer insulating container body.

An alternative illustrative embodiment of an outer insulated container of an insulated food and/or beverage container system is seen generally at 101 in FIGS. 17-19. Unlike the illustrative embodiment described above, the outer container lid is threadingly engaged with the cylindrical container body portion in the embodiment of FIGS. 17-19. Referring to these figures, it can be seen that, in other respects, the outer insulated container 101 is generally the same as the outer insulated container and lid 10, 40 described above. Moreover, many of the elements are common to these embodiments. For the sake of brevity, the elements that the embodiment of FIGS. 17-19 has in common with the preceding embodiments will not be discussed because these components have already been described in detail above.

In particular, as shown in FIGS. 17-19, similar to the outer insulated container 10 described above, the outer insulated container 101 generally comprises a cylindrical body portion 110 with an inner surface 112 and an outer surface 111. In the illustrative embodiment, the outer insulated container 101 further comprises a removable outer container lid 140 that is configured to sealingly engage with the cylindrical body portion 110 so as to minimize thermal transfer with an outside environment. Like the outer insulated container 10 described above, the outer insulated container 101 is configured to receive the inner container 20 therein for covering the inner surface 112 of the cylindrical body portion 110 of the outer insulated container 101 so as to prevent a food and/or the beverage from contacting the inner surface 112, and thereby obviate a need for cleaning the food and/or the beverage from the inner surface 112 of the cylindrical body portion 110.

In the illustrative embodiment of FIGS. 17-19, similar to the outer insulated container 10 described above, the cylindrical body portion 110 of the outer insulated container 101 further comprises an outer wall with the outer surface 111, an inner wall with the inner surface 112, and a vacuum-sealed space or cavity 113 in between the outer wall and the inner wall configured to provide an insulative cavity so as to minimize thermal transfer with the outside environment.

Referring to FIGS. 17-19, in the alternative illustrative embodiment, the top end portion of the cylindrical body portion 110 of the outer insulated container 101 comprises a plurality of external threads 116 that correspond to a plurality of internal threads 144 on the removable outer container lid 140 such that the outer container lid 140 has a screw-on type engagement with the cylindrical body portion 110. Also, as shown in the illustrative embodiment of FIGS. 17-19, the outer container lid 140 has an outer surface 141 and a food container cavity 145 for accommodating the protruding top end portion of the inner container 20. In addition, similar to the outer container lid 40 described above, the outer container lid 140 has a sip hole sliding cover that is able to be used by a user to selectively open and close the sip hole in the outer container lid 140.

Also, in the alternative illustrative embodiment, with reference again to FIGS. 17-19, the outer insulated container 101 further comprises a circumferential rim 115 at an uppermost end of the cylindrical body portion 110. As described above for the first illustrative embodiment, when the inner container 20 is disposed within the outer insulated container 101, the annular ledge 24 of the inner container 20 rests on and partially or entirely covers the circumferential rim 115 at the uppermost end of the cylindrical body portion 110 of the outer insulated container 101.

It is readily apparent that the aforedescribed insulated food and/or beverage container system 1 offers numerous advantages and/or benefits. First, the inner container 20 may be in a form of a food cartridge containing a microwaveable meal in a disposable container that can be held at temperature and enjoyed much later. Existing microwave meals cool down quickly in their containers so a user would need to have a microwave on location to enjoy the meal warm. This aforedescribed design adds the benefit of significant flexibility and convenience. For example, a truck driver can heat the next meal at a rest stop, and skip a future meal stop; a construction worker can bring a warm meal to a remote site; a doctor can eat a warm meal in intervals between patients, etc. Secondly, the outer insulated container 10, 101 can fit the food container 20, fully sealed with a lid 40, 140, inside. No conventional containers are designed to do this. This generates the important benefit that the outer container 10, 101 stays clean and can be used for a later meal without washing or used as a beverage cup immediately after the meal. Thirdly, the inner container 20 locks into the outer container 10, 101, but also leaves some space between the two. In the embodiments described above, there are a few contact points, but not complete contact. The walls of the inner container 20, as well as the added air barrier between the inner and outer container 10, 20 or 101, 20, provide the benefit of improved insulation when compared to a conventional container filled directly with heated food/contents.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. An insulated food and/or beverage container system, comprising:
    an outer insulated container, the outer insulated container including a cylindrical body portion with an inner surface and an outer surface, the outer insulated container further including a removable outer container lid that is configured to sealingly engage with the cylindrical body portion so as to minimize thermal transfer with an outside environment, the outer insulated container additionally including a circumferential rim at an upper end of the cylindrical body portion of the outer insulated container; and
    an inner container configured to fit within the outer insulated container, the inner container defining an interior cavity for holding food and/or a beverage, the inner container including one or more first elements that are configured to matingly engage with one or more second elements on the cylindrical body portion of the outer insulated container so that the inner container is able to fully and securely nest inside the outer insulated container without any spinning or significant rattling, the inner container further including an annular ledge below an upper open end of the inner container, the annular ledge extending between a first lower wall portion of the inner container and a second upper wall portion of the inner container, the first lower wall portion of the inner container being attached to an inner end of the annular ledge and the second upper wall portion of the inner container being attached to a distal outer end of the annular ledge, the second upper wall portion of the inner container being outwardly offset in a radial direction relative to a longitudinal axis of the inner container from the first lower wall portion of the inner container;
    wherein, when the inner container is disposed within the outer insulated container, the outer insulated container and the inner container collectively provide enhanced insulating characteristics, and the inner container covers the inner surface of the cylindrical body portion of the outer insulated container so as to prevent the food and/or the beverage from contacting the inner surface, and thereby obviate a need for cleaning the food and/or the beverage from the inner surface of the cylindrical body portion; and
    wherein the annular ledge of the inner container rests on and partially or entirely covers the circumferential rim at the upper end of the cylindrical body portion of the outer insulated container, the annular ledge of the inner container functioning as a drip lip so as to prevent the food and/or the beverage in the interior cavity of the inner container from spilling over and onto the inner surface of the cylindrical body portion of the outer insulated container, and thereby obviate the need for cleaning the food and/or the beverage from the inner surface of the cylindrical body portion.

2. The insulated food and/or beverage container system according to claim 1, wherein the one or more first elements of the inner container are selected from the group consisting of one or more slots, one or more grooves, one or more dimples, one or more channels, one or more protrusions, one or more ridges, one or more rails, and combinations thereof; and
    the one or more second elements of the outer insulated container are selected from the group consisting of one or more protrusions, one or more ridges, one or more rails, one or more dimples, one or more slots, one or more grooves, one or more channels, and combinations thereof;
    wherein, when the inner container is disposed within the outer insulated container, the inner container is configured to fit snugly within the outer insulated container at expected temperatures of use, while accommodating thermal expansion and/or contraction.

3. The insulated food and/or beverage container system according to claim 1, wherein the one or more first elements of the inner container are in a form of one or more slots, and the one or more second elements of the outer insulated container are in a form of one or more protrusions that matingly engage with corresponding ones of the one or more slots in the inner container.

4. The insulated food and/or beverage container system according to claim 1, wherein the inner container further comprises an annular flange at the upper open end of the inner container and a removable inner container lid, the annular flange disposed above the annular ledge of the inner container, and the annular flange of the inner container being used for hermetic sealing of the inner container and as an anchor point for the removable inner container lid; and
    wherein the inner container rests on the circumferential rim of the outer insulated container and protrudes slightly above one or more outer walls of the outer insulated container so that the inner container is able to be easily grasped for removal by a user, and so the inner container lid is able to be removed or replaced easily while the inner container remains fully seated inside the outer insulated container.

5. The insulated food and/or beverage container system according to claim 4, wherein the outer container lid of the outer insulated container seals tightly and fits over and around a top end portion of the outer insulated container, the outer container lid providing space for the nested inner container to be fully contained inside the outer insulated container despite resting on and protruding slightly above the circumferential rim at the upper end of the cylindrical body portion of the outer insulated container; and wherein the circumferential rim of the cylindrical body portion of the outer insulated container and the annular ledge of the inner container allows for a union between the outer and inner containers that prevents the food and/or the beverage in the interior cavity of the inner container from dripping or falling into and contaminating the inner surface of the outer insulated container while the inner container is nested inside the outer insulated container.

6. The insulated food and/or beverage container system according to claim 5, wherein the top end portion of the outer insulated container further comprises a circumferential groove that receives a gasket member in the circumferential groove, the circumferential groove disposed below the circumferential rim of the outer insulated container, and the gasket member enabling the outer container lid of the outer insulated container to seal tightly with the cylindrical body portion of the outer insulated container.

7. The insulated food and/or beverage container system according to claim 1, wherein the cylindrical body portion of the outer insulated container further comprises an outer wall with the outer surface, an inner wall with the inner surface, and a vacuum-sealed space in between the outer wall and the inner wall configured to provide an insulative cavity so as to minimize thermal transfer with the outside environment.

8. The insulated food and/or beverage container system according to claim 1, wherein the inner container is a food container with a removable inner container lid that is configured to safely contain food while the food is being heated in a microwave, and while the inner container is being stored and insulated within the outer insulated container.

9. An insulated food and/or beverage container system, comprising:
an outer insulated container, the outer insulated container including a cylindrical body portion with a circular sidewall having an inner surface and an outer surface, the outer insulated container further including a removable outer container lid that is configured to sealingly engage with the cylindrical body portion so as to minimize thermal transfer with an outside environment, the outer insulated container additionally including a circumferential groove that receives a gasket member in the circumferential groove, the circumferential groove disposed in an upper portion of the outer surface of the circular sidewall of the cylindrical body portion of the outer insulated container, the circumferential groove disposed below a circumferential rim at an upper end of the cylindrical body portion of the outer insulated container, and the gasket member enabling an inner surface of a downwardly extending sidewall of the outer container lid of the outer insulated container to seal tightly with the outer surface of the circular sidewall of the cylindrical body portion of the outer insulated container; and
the outer insulated container further including one or more first elements that are configured to matingly engage with one or more second elements on an inner container so that the inner container is able to fully and securely nest inside the outer insulated container without any spinning or significant rattling;

wherein the cylindrical body portion of the outer insulated container further comprises an upper cylindrical portion and a lower cylindrical portion, the lower cylindrical portion having a smaller diameter than the upper cylindrical portion, the outer insulated container further comprising a tapered middle portion extending outwardly from an upper end of the lower cylindrical portion to a lower end of the upper cylindrical portion, the outer insulated container additionally comprising a bottom wall connected to a lower end of the lower cylindrical portion, the one or more first elements of the outer insulated container being disposed on the tapered middle portion of the outer insulated container, and the one or more first elements being vertically spaced apart from the bottom wall of the outer insulated container by a gap.

10. The insulated food and/or beverage container system according to claim 9, further comprising the inner container configured to fit within the outer insulated container, the inner container defining an interior cavity for holding food and/or a beverage;

wherein, when the inner container is disposed within the outer insulated container, the outer insulated container and the inner container collectively provide enhanced insulating characteristics, and the inner container covers the inner surface of the circular sidewall of the cylindrical body portion of the outer insulated container so as to prevent the food and/or the beverage from contacting the inner surface of the circular sidewall, and thereby obviate a need for cleaning the food and/or the beverage from the inner surface of the circular sidewall of the cylindrical body portion.

11. The insulated food and/or beverage container system according to claim 10, wherein the inner container further comprises an annular flange at an upper open end of the inner container and a removable inner container lid, the annular flange of the inner container being used for hermetic sealing of the inner container and as an anchor point for the removable inner container lid; and wherein the inner container rests on and protrudes slightly above the circular sidewall of the cylindrical body portion of the outer insulated container so that the inner container is able to be easily grasped for removal by a user, and so the inner container lid is able to be removed or replaced easily while the inner container remains fully seated inside the outer insulated container.

12. The insulated food and/or beverage container system according to claim 11, wherein the inner container further comprises an annular ledge below the annular flange at the upper open end of the inner container;

wherein the annular ledge of the inner container rests on and partially or entirely covers the circumferential rim at the upper end of the outer insulated container, the annular ledge of the inner container functioning as a drip lip so as to prevent the food and/or the beverage in the interior cavity of the inner container from spilling over and onto the inner surface of the circular sidewall of the cylindrical body portion of the outer insulated container, and thereby obviate the need for cleaning the food and/or the beverage from the inner surface of the circular sidewall of the cylindrical body portion.

13. The insulated food and/or beverage container system according to claim 12, wherein the outer container lid of the outer insulated container seals tightly and fits over and around a top end portion of the outer insulated container, the outer container lid providing space for the nested inner container to be fully contained inside the outer insulated container despite resting on and protruding slightly above the circumferential rim at the upper end of the cylindrical body portion of the outer insulated container; and wherein the circumferential rim of the cylindrical body portion of the outer insulated container and the annular ledge of the inner container allows for a union between the outer and inner containers that prevents the food and/or the beverage in the interior cavity of the inner container from dripping or falling into and contaminating the inner surface of the circular sidewall of the cylindrical body portion of the outer insulated container while the inner container is nested inside the outer insulated container.

14. An insulated food and/or beverage container system, comprising:

an inner container configured to fit within an outer insulated container, the inner container defining an interior cavity for holding food and/or a beverage, the inner container including one or more first elements that are configured to matingly engage with one or more second elements on a cylindrical body portion of the outer insulated container so that the inner container is able to fully and securely nest inside the outer insulated container without any spinning or significant rattling, the inner container further including an annular ledge below an upper open end of the inner container, the annular ledge extending between a first lower wall portion of the inner container and a second upper wall portion of the inner container, the first lower wall portion of the inner container being attached to an inner end of the annular ledge and the second upper wall portion of the inner container being attached to a distal outer end of the annular ledge, the second upper wall portion of the inner container being outwardly offset in a radial direction relative to a longitudinal axis of the inner container from the first lower wall portion of the inner container; and the inner container further including a removable inner container lid that is configured to safely contain the food and/or the beverage while the food and/or the beverage is being heated in a microwave, and while the inner container is being stored and insulated within the outer insulated container; and wherein the annular ledge of the inner container is configured to rest on and partially or entirely cover a circumferential rim at an upper end of the cylindrical body portion of the outer insulated container, the annular ledge of the inner container configured to function as a drip lip so as to prevent the food and/or the beverage in the interior cavity of the inner container from spilling over and onto an inner surface of the cylindrical body portion of the outer insulated container, and thereby obviate the need for cleaning the food and/or the beverage from the inner surface of the cylindrical body portion.

15. The insulated food and/or beverage container system according to claim 14, further comprising the outer insulated container, the outer insulated container including the cylindrical body portion with the inner surface and an outer surface, the outer insulated container further including a removable outer container lid that is configured to sealingly engage with the cylindrical body portion so as to minimize thermal transfer with an outside environment;

wherein, when the inner container is disposed within the outer insulated container, the outer insulated container and the inner container collectively provide enhanced insulating characteristics, and the inner container covers the inner surface of the cylindrical body portion of the outer insulated container so as to prevent the food and/or the beverage from contacting the inner surface, and thereby obviate a need for cleaning the food and/or the beverage from the inner surface of the cylindrical body portion.

16. The insulated food and/or beverage container system according to claim 15, wherein the inner container further comprises an annular flange at the upper open end of the inner container and a removable inner container lid, the annular flange disposed above the annular ledge of the inner container, and the annular flange of the inner container being used for hermetic sealing of the inner container and as an anchor point for the removable inner container lid; and wherein the inner container rests on the circumferential rim of the outer insulated container and protrudes slightly above one or more outer walls of the outer insulated container so that the inner container is able to be easily grasped for removal by a user, and so the inner container lid is able to be removed or replaced easily while the inner container remains fully seated inside the outer insulated container.

17. The insulated food and/or beverage container system according to claim 16, wherein the outer container lid of the outer insulated container seals tightly and fits over and around a top end portion of the outer insulated container, the outer container lid providing space for the nested inner container to be fully contained inside the outer insulated container despite resting on and protruding slightly above the circumferential rim at the upper end of the cylindrical body portion of the outer insulated container; and wherein the circumferential rim of the cylindrical body portion of the outer insulated container and the annular ledge of the inner container allows for a union between the outer and inner containers that prevents the food and/or the beverage in the interior cavity of the inner container from dripping or falling into and contaminating the inner surface of the outer insulated container while the inner container is nested inside the outer insulated container.

18. The insulated food and/or beverage container system according to claim 14, wherein the one or more first elements of the inner container are disposed on a bottom end portion of the inner container.

* * * * *